United States Patent [19]

Inoue

[11] Patent Number: 5,494,586

[45] Date of Patent: Feb. 27, 1996

[54] OIL-WATER SEPARATION APPARATUS

[75] Inventor: Noboru Inoue, Ono, Japan

[73] Assignee: Toyota Jidosha Kabushiki Kaisha, Toyota, Japan

[21] Appl. No.: 189,129

[22] Filed: Jan. 31, 1994

Related U.S. Application Data

[63] Continuation of Ser. No. 961,191, Oct. 14, 1992, abandoned, which is a continuation of Ser. No. 700,288, May 15, 1991, abandoned.

[30] Foreign Application Priority Data

Jun. 20, 1990 [JP] Japan ................ 2-162361

[51] Int. Cl.$^6$ ........................................ C02F 1/48
[52] U.S. Cl. ........................ 204/666; 210/800; 210/243; 210/527; 210/DIG. 5; 210/748; 204/672; 204/673
[58] Field of Search ..................... 210/243, 522, 210/532.1, 540, 748, DIG. 5, 527, 800; 204/149, 181.8, 186, 275, 302, 305, 306

[56] References Cited

U.S. PATENT DOCUMENTS

| | | | |
|---|---|---|---|
| 2,849,395 | 8/1958 | Wintermute | 204/305 |
| 3,004,672 | 10/1961 | Conley et al. | 210/527 |
| 3,476,678 | 11/1969 | Murdock, Sr. | 204/308 |
| 3,849,285 | 11/1974 | Prestridge | 204/305 |
| 4,200,516 | 4/1980 | Pope | 204/302 |
| 4,422,931 | 12/1983 | Wolde-Michael | 210/540 |
| 4,917,782 | 4/1990 | Davies | 204/152 |

FOREIGN PATENT DOCUMENTS

| | | |
|---|---|---|
| 0085847 | 8/1983 | European Pat. Off. . |
| 0175191 | 3/1986 | European Pat. Off. . |
| 58-156309 | 3/1982 | Japan . |
| 62-91214 | 4/1987 | Japan . |
| 3-77603 | 4/1991 | Japan . |
| 1079267 | 3/1984 | U.S.S.R. ............... 210/243 |
| WOA8607586 | 12/1986 | WIPO . |

*Primary Examiner*—Matthew O. Savage
*Attorney, Agent, or Firm*—Armstrong, Westerman, Hattori, McLeland & Naughton

[57] ABSTRACT

The present invention relates to an oil-water separation apparatus which permits oil-water separation of heavily polluted oil-water mixed liquids or mixed liquids of high viscosity oil and water, etc., to be efficiently made. The present invention consists in an oil-water separation apparatus characterized in that in a top-opened separator tank into which oil-water mixed liquid is fed from a source liquid tank in which the oil-water mixed liquid of the source liquid, being the object of treatment, is contained, the inside-tank space is disected into an oil-water separation space and a separated water containing space, a partition plate is hung in the tank, forming under its bottom a communication route for enabling circulation between these two spaces, and while an oil outlet is opened through the part of the tank wall where the separated oil accumulates, a plural number of charged plates on which a voltage is applied are arranged, each two of them vis-à-vis, in the aforementioned oil-water separation space, said source liquid to be fed through the aforementioned oil-water separation space on which the electric filed acts.

5 Claims, 10 Drawing Sheets

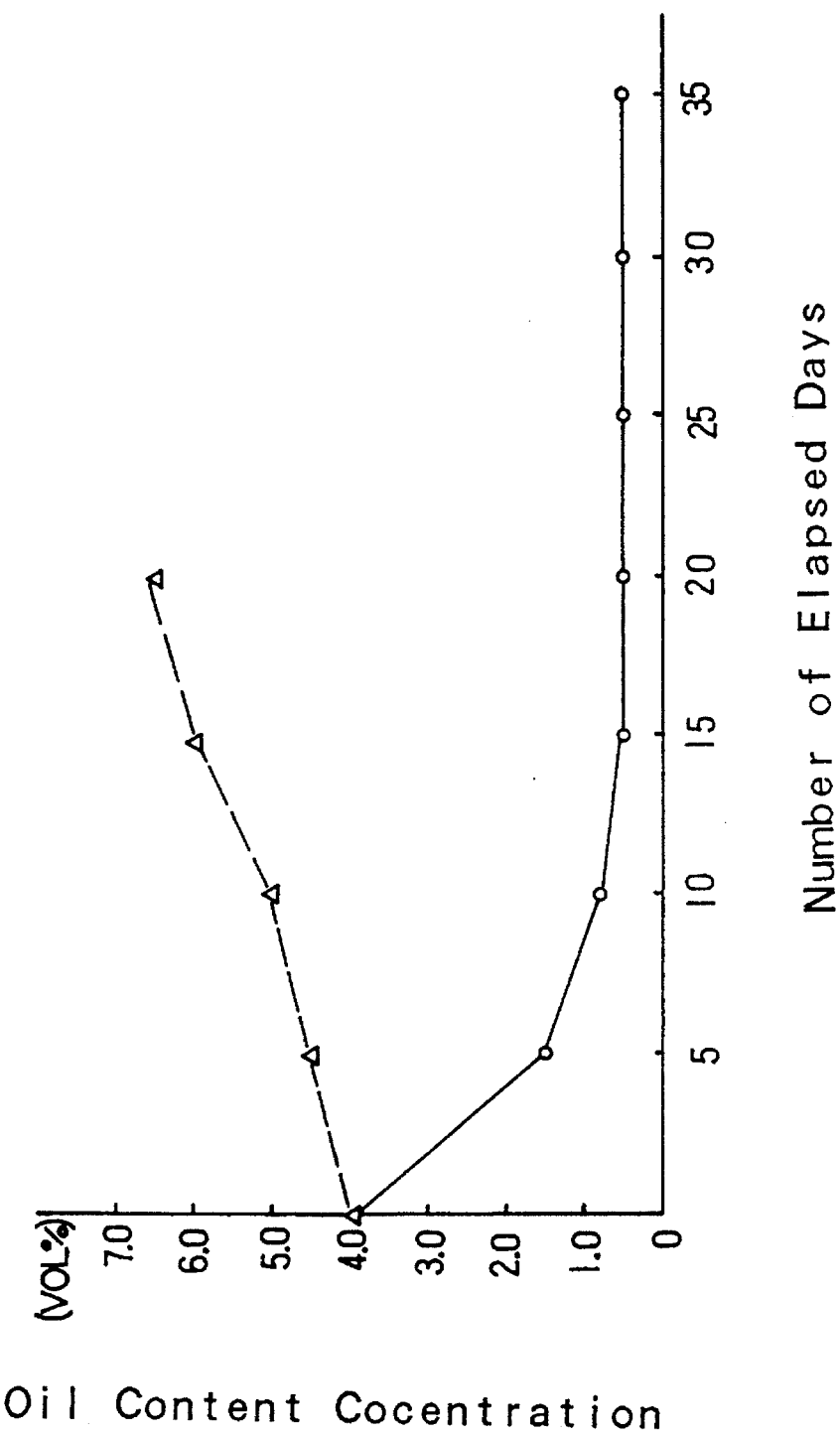

OIL-WATER SEPARATION APPARATUS

This application is a continuation of application Ser. No. 07/961,191, filed Oct. 14, 1992, now abandoned, which in turn is a continuation of application Ser. No. 07/700,288, filed May 15, 1991, now abandoned.

BACKGROUND OF THE INVENTION

1. Field of the Invention

The present invention relates to an oil-water separation apparatus which permits oil-water separation of heavily polluted oil-water mixed liquids or mixed liquids of high viscosity oil and water or the like to be efficiently made.

2. Description of Prior Art

As oil-water separation methods, heretofore available are such methods as of sp.gr. specific gravity difference separation by making use of an inclined board or by forming a roundabout route or oil-water separation by use of a coalescer, etc.

However, these methods could not deal with oil-water separation of heavily polluted oil-water mixed liquids or mixed liquids of high viscosity oil and water.

For example, in hot or warm forging, water soluble graphite mold releasing agent is used. If any oil like high viscosity lubricating oil, etc., is mixed into this water soluble graphite, a phenomenon of the graphite coating being cut at the oil drop parts takes place, with a result that the work in red hot state and the mold surface are directly in contact with each other, resulting in the latter's abrasion; consequently, the mold life is notably curtailed, causing lowered quality of the molded product or creation of loss time in the manufacturing process, etc., with resultant increase in cost. Separating high viscosity lubricating oil from water soluble graphite mold releasing agent is a very important element for enhancement of production efficiency, but the conventional sp.gr. difference separation methods could not deal with such applications.

BRIEF SUMMARY OF THE INVENTION

The present invention has been conceived in view of such a situation. It has as its object providing an oil-water separation apparatus which enables oil-water separation of the aforementioned oil-water mixed liquids which could not be treated by conventional oil-water separation apparatuses and is particularly intended to provide an oil-water separation apparatus which enables oil-water separation of any mixed liquid of high viscosity lubricating oil and water soluble graphite mold releasing agent which is formed in hot and warm forging.

The gist of this invention which has solved the above-described problem is characterized in that in a top-opened separator tank into which the oil-water mixed liquid is fed from a source liquid tank in which the oil-water mixed liquid of the source liquid, being the object of treatment, is contained, the tank-inside space is disected into an oil-water separation space and a separated water containing space, a partition plate is hung in the tank, forming under its bottom a communication route which enables circulation between the aforementioned two spaces, and while an oil outlet is opened through the part of the tank wall where the separated oil accumulates, a plural number of charged plates on which a voltage is applied are arranged, each two of them vis-à-vis, inside the aforementioned oil-water separation space, said source liquid to be fed into the aforementioned oil-water separation space on which the electric field acts.

Any other partitioning means are usable in place of the partition plate, if only they can disect the separator tank into the oil-water separation space and the separated water containing space; for example, an inverse U-shape tube having one end thereof opened in proximity to the bottom of the tank may be employed.

The oil outlet is opened at a part where oil is accumulated, but it is particularly desirable to locate it at the upper part of the tank wall surrounding the oil-water separation space.

The mode of arrangement of the charged plates arranged, two each of them vis-à-vis, in the oil-water separation space should be appropriately selected in accordance with the type of the liquid to be treated and the concentration of the oil content. For example, laterally parallel arrangement in the horizontal direction or longitudinally parallel arrangement in the vertical direction, etc., may be employed.

For the voltage to be applied on the charged plates, an AC voltage of 1–50 V/cm is desired to be chosen.

The operation mode of the oil-water separation apparatus of such a composition as hereabove-described is as follows: First, the oil-water mixed liquid of the source liquid, being the object of treatment, is fed from the source liquid tank into the oil-water separation space, being one of the spaces demarcated by a partition plate in the separator tank.

In addition to the fact that the oil-water mixed liquid fed into the oil-water separation space is separated by the physical separation action based on their sp.gr. difference, an electric field is acting on the oil-water separation space, due to the existence of the charged plates, whereby the zeta potential the oil drop particles have is neutralized by the electric field and, consequently, the phenomenon of cohesion of oil drop particles into coarse particles by dint of inter-molecular attraction is promoted, with a result that the oil content is efficiently accumulated in the upper layer of the oil-water separation space. Since the oil-water separation space and the separated water containing space are communicated through a communication route located under the bottom of the partition plate, the settled water content is fed to the separated water containing space through this communication route. And the separated oil content is discharged out of the tank through the oil outlet formed at the floated-up oil accumulating place.

When an inverse U-shape tube is used in place of the partition plate, the water content settled to the bottom part of the oil-water separation space due to the sq.gr. difference is drained out of the tank through the inverse U-shape tube.

Particularly, when the position where the oil outlet is formed is set at the top of the tank wall surrounding the oil-water separation space, the floated-up oil accumulating at the top layer of the oil-water separation space may be normally discharged by itself.

When as the charged plates installed in the oil-water separation space, those placed in the horizontal direction are used, not only the charging effect is enhanced, but a roundabout route for passing the oil-water mixed liquid is formed between the charged plates, thereby lengthening the passage of the oil-water mixed liquid, for the benefit of elevated oil-water separation effect.

When the charged plates are longitudinally installed in the vertical direction, the oil-water separation space is finely divided, whereby not only the charging effect can be enhanced, but the amount of oil stuck on the charged plates can be reduced. On this account, an oil-water separation apparatus conductive to easy maintenance can be provided.

Further, since the oil-water separation apparatus of this invention utilizes a top-opened separator tank, its maintenance operation such as tank-inside cleaning, etc., is easy, so that its excellent oil-water separation capacity may be maintained by cleaning the tank-inside, if soiled.

BRIEF DESCRIPTION OF THE DRAWINGS

FIG. 11 is a graph showing the result of an experiment carried out, using the apparatus of the fourth embodiment.

DETAILED DESCRIPTION OF THE PREFERRED EMBODIMENTS

Figure 1A:
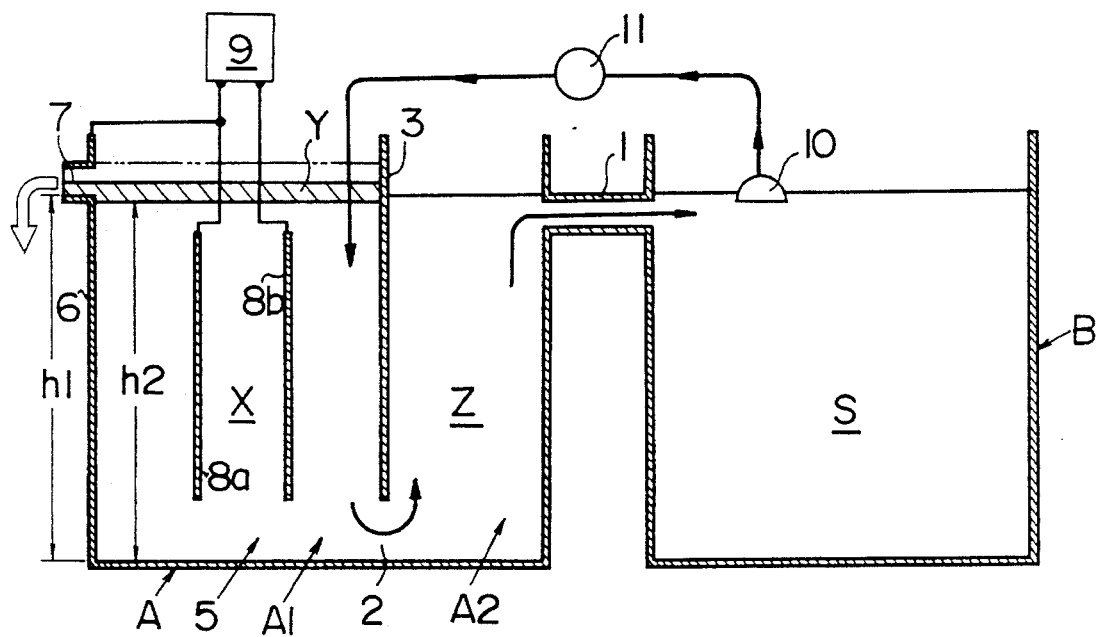
FIG. 1(a) is a longitudinal sectional view for explanation of the first embodiment of this invention.
Figure 1B:
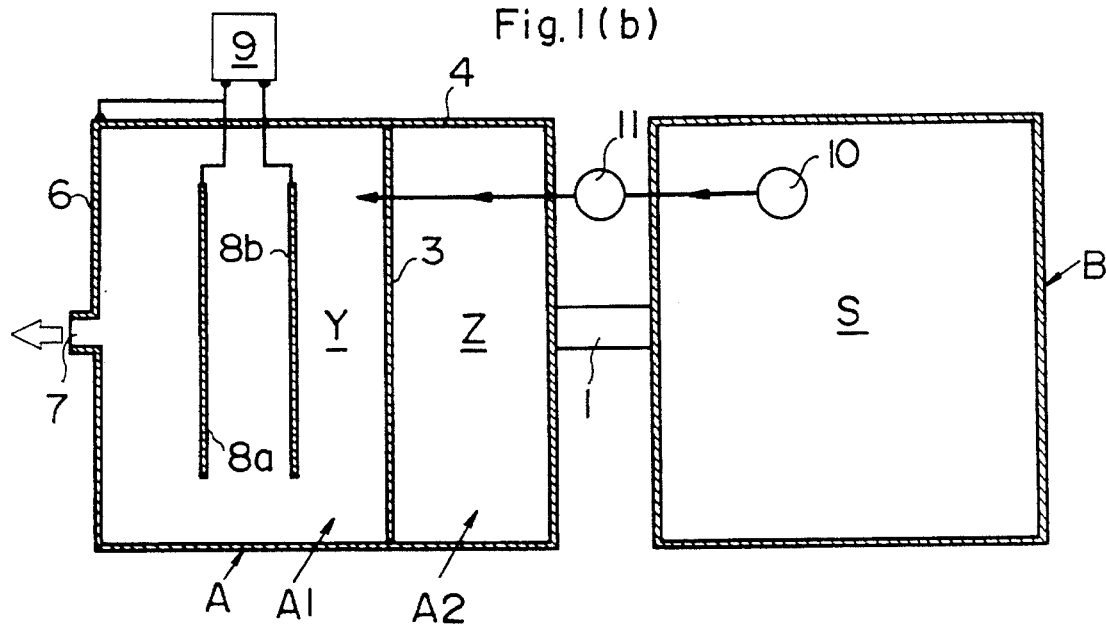
FIG. 1(b) is a lateral sectional view for explanation of the same.

In the following, this invention is described in detail in connection with an embodiment thereof with reference to the accompanying drawings in which: FIG. 1(a) is a longitudinal sectional view for explanation of an embodiment of this invention; and FIG. 1(b), a lateral sectional view of said embodiment.

In this drawing, A denotes a top-opened separator tank and in the neighboring position to said separator tank, a source liquid tank B communicated with the separator tank A through a connection pipe 1 is arranged. The position where the connection pipe 1 is formed is in line with the tops of the respective side walls of the separator tank A and the source liquid tank B.

Inside the separator tank A, a partition plate 3 which provides a clearance as a communication route 2 under the bottom thereof is hung, supported by the side wall 4 of the separator tank A, whereby the tank inside space 5 is bisected into an oil-water separation space A1 and a separated water containing space A2 communicated with the source liquid tank B.

At the top of the side wall 6 of the oil-water separation space A1, an oil outlet 7 is opened outward from the separator tank, so as to permit the floated-up oil which has accumulated at the top layer of the oil-water separation space A1 to be discharged by itself. The level h1 of the lower edge of the oil outlet 7 needs to be set higher than the level h2 of the oil-water interface inside the oil-water separation space A1.

Shown as 8a and 8b in this figure are charged plates installed longitudinally parallel in the vertical direction in the oil-water separation space A1, one of the charged plates 8a being set at the same potential as that of the separator tank A, while to the other charged plate 8b, is fed and applied from a charging source 9 an AC voltage of 1–50 V/cm between it and the aforementioned charged plate 8a. The choice of an AC voltage for the voltage applied is to avoid electric corrosion, but DC voltage may be used, when the conductivity of the oil-water mixed liquid X is low. The magnitude of the voltage may be appropriately selected, according to the state of the oil-water mixed liquid X. Generally, the smaller the particle of the oil-drop, the higher the voltage that needs to be applied. For example, if the oil-water mixed liquid is being emulsified, a voltage of 40–50 V/cm should preferably be applied.

In this figure, numeral 10 denotes a float suction arranged on the liquid surface of the source liquid S contained in the source liquid tank B, with a pump 11 correlated with said float suction 10, to suck up the source liquid surface layer part, thereby refluxing it into the oil-water separation space A1.

The operation mode of the oil-water separation apparatus of such a composition is as follows:

The source liquid S, being the object of treatment, contained in the source liquid tank B is fed into the separator tank A by an appropriate means. At this stage, the oil-water mixed liquid which fills the oil-water separation space A1, the separated water containing space A2 and the source liquid tank B has a same concentration and is at an identical level everywhere, particularly with the level of the oil-water mixed liquid in the oil-water separation space A1 held nearly flush with the lower edge of the oil outlet 7.

The oil-water mixed liquid X fed to each tank begins to separate into oil content and water content due to the sp.gr. difference therebetween, the oil content concentration becoming higher in the surface layer part, as compared with the lower layer, with passage of time. Since the minute oil drops in the oil-water mixed liquid are ionized with a same polarity, they are mutually repelling due to the zeta potential, so that they are floating in the form of oil drops as they are, but as an electric field is acted on the oil-water mixed liquid X being in this state, the zeta-potential is neutralized; as a result, cohesion of oil drops into coarse particles is brought about by the intermolecular attraction, thereby promoting the oil-water separation. If the electric field is acted on the oil-water mixed liquid, when any surfactant is mixed therein, the electric bonding links between the hydrophilic groups of the surfactant and the water molecules are cut off, thereby separating oil and water. Then the separated lipophilic groups and oil float in the water as oil drops and with the zeta-potential the separated oil drops have neutralized by the electric field, they can be cohered into coarse particles.

Coincidentally as the oil-water separation action is proceeded as hereabove-described in the oil-water separation space A1, the source liquid S containing a high concentration of oil content is sucked up by the float-suction 10 from the source liquid tank B and fed into the oil-water separation space A1. Since the surface layer part of the oil-water mixed liquid X which fills the oil-water separation space A1 is held at a higher oil content concentration, as compared with its lower layer, as high concentration oil content is further poured into the oil-water mixed liquid X in this state from the source liquid tank B, the layer thickness of the floated-up oil Y which is accumulated at the surface layer part grows thicker and thicker. And with increasing supply of the source liquid S, the liquid level goes up, then, such a pressure is exerted on the liquid surface in the oil-water separation space A1 that it is brought to the same liquid level as that of the separated water Z in the neighboring separated water containing space A2, because the oil-water separation space A1 and the separated water containing space A2 are communicated through a communication route 2, and as a result, the water content which has settled in the oil-water separation space A1 begins flowing toward the separated water containing space A2 through the communication route 2.

Even in the separated water Z which fills the separated water containing space A2, some oil content is mixed, although at a low percentage, but also in the separated water containing space A2, the oil-water separation depending on sp.gr. difference, with the separated water Z as the object, is performed, then, this oil content is accumulated at the surface layer and, thereafter, the floated-up oil is refluxed to the source liquid tank B through a connection pipe 1.

Through repetition of the above-described steps, the layer thickness of the floated-up oil which is accumulated in the surface layer of the oil-water mixed liquid X in the separator tank A grows thicker and thicker and as the oil level rises over the level of the lower edge of the oil outlet 7, the floated-up oil Y flows down by itself through the oil outlet 7. Accordingly, in this embodiment, merely by refluxing the oil-water mixed liquid from the source liquid tank B to the separator tank A, while applying a voltage on the charged plates 8a and 8b arranged in the oil-water separation space A1, the oil-water mixed liquid may be circulated between the source liquid tank B and the separator tank A, thereby separating and accumulating oil content. Since in addition to the physical separation action by dint of sp.gr. difference, the electric field action is jointly applied in the process of oil-water separation, high efficiency oil-water separation becomes possible; thus, separation with highly polluted mixed liquids or mixed liquids of high viscosity oil and water or further, oil-water mixed liquids in which surfactants are mixed or the like, which were heretofore hard to separate, becomes possible. Since the accumulated oil content may be discharged by itself through the oil outlet 7, such a trouble as operating an opening/closing valve, etc., will be spared.

Figure 2A:
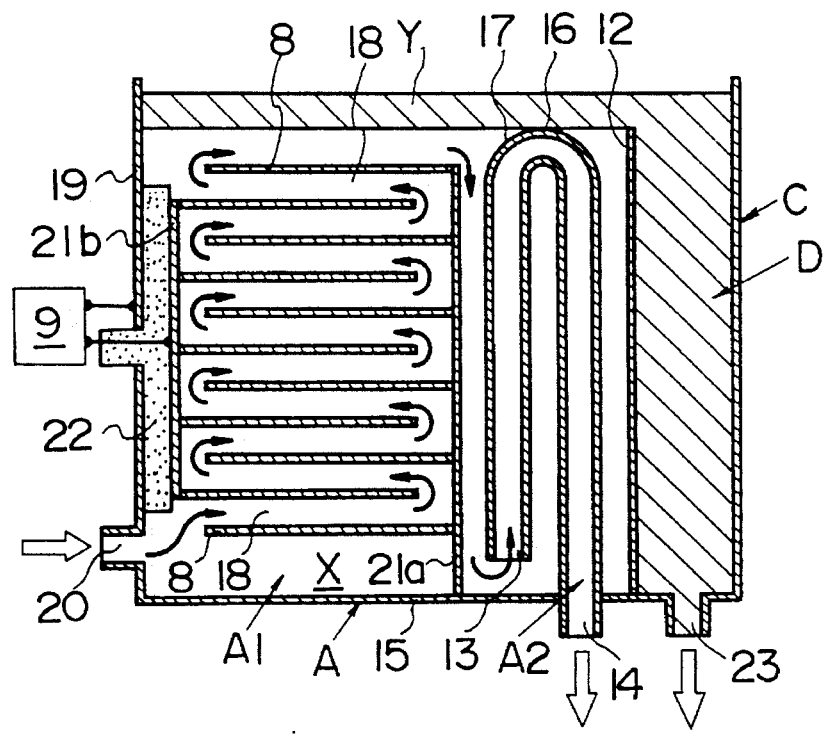
FIG. 2(a) is a longitudinal sectional view for explanation of the second embodiment of this ivention.
Figure 2B:
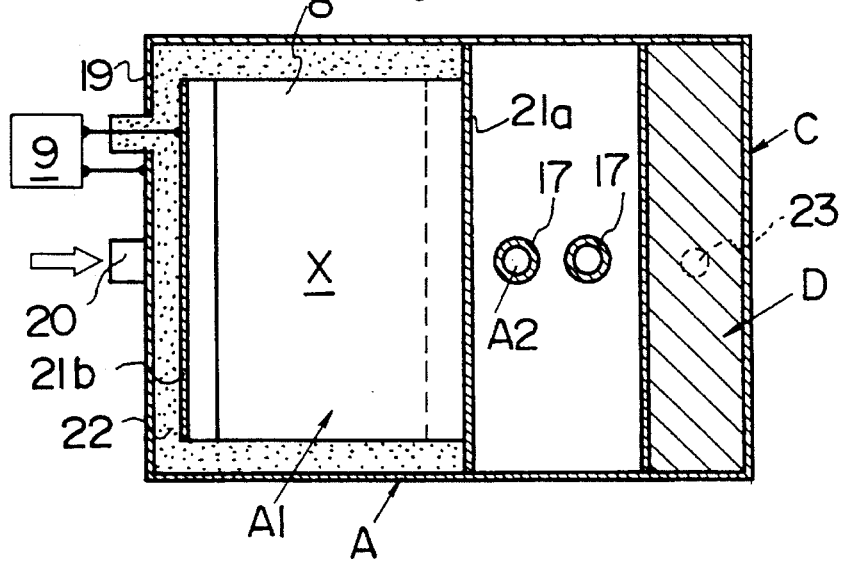
FIG. 2(b) is a lateral sectional view for explanation of the same.

The apparatus shown in FIGS. 2(*a*) and (*b*) is the second embodiment of this invention, in which an inverse U-shape tube is used in place of the partition plate and as the charging means, a large number of charged plates laterally installed in the horizontal direction are employed. In this figure, letter C denotes a treatment tank having a separator tank A and an oil tank D integrally formed, with a partition wall 12 interposed therebetween. The height of the partition wall 12 is preset at such a level that the floated-up oil Y which is accumulated at the top layer of the oil-water mixed liquid X filled in the treatment tank C is allowed to fall down into the oil tank D. At a position toward the partition wall 12 in the separator tank A, an inverse U-shape tube is arranged, with one lower end opening 13 thereof disposed adjacent to the bottom part of the separator tank A and with the other lower end opening 14 projected from the separator tank A through its bottom 15, the top 16 of the bending portion thereof being flush with the level of the top of the aforementioned partition wall, 12, whereby the inside of the separator tank A is demarcated into a separated water containing space A2 formed inside the inverse U-shape tube and an oil-water separation space A1 being the space outside the inverse U-shape tube. Besides, at one side of the inverse U-shape tube 17, a large number of charged plates 8, each two of them with opposite polarities and facing one another, are laterally installed, thereby forming a roundabout route 18 for passing the oil-water mixed liquid between respective charged plates 8. The charged plate 8 at the lowermost tier is designed to have a free end on the treatment tank outer wall 19 side located on the opposite side to the partition wall 12, to allow the source liquid access to the roundabout route 18, said source liquid being pressed in through the liquid inlet 20 opened at the bottom part of the treatment tank outer wall 19. And the charged plate 8 of the uppermost tier is also designed to have a free end on the treatment tank outer-wall 19 side, so that the oil-water mixed liquid X which has risen through the roundabout route 18 in the oil-water separation space A1 flow out at a position as far apart as possible from the lower end opening 13 of the inverse U-shape tube 17. In this figure, 21a and 21b designate supporting plates each for integrally supporting each of two groups of charged plates 8 respectively with the same polarity and 22 stands for an insulator for electrically insulating the supporting plate 21b and the treatment tank C from each other.

In the oil-water separation apparatus of such an embodiment, the source liquid, being the object of treatment, is pressed in through the inlet 20, to allow the oil-water mixed liquid X access to the roundabout route 18 formed between the charged plates 8 and after passing it through the roundabout route 18, it is discharged to the top layer of the oil-water separation space A1. Since an electric field is acting on the roundabout route 18, the oil content in the oil-water mixed liquid separates in the process of passing the roundabout route 18, causing the floated-up oil to accumulate at the top layer of the oil-water separation space A1. The water content in the oil-water mixed liquid is led to the charged plate 8 at the uppermost tier and the supporting plate 21a, then, settles down and after making inroad into the inverse U-shape tube 17 through its lower end opening 13 and once going up, again flows down, to be discharged out of the tank through the drain hole 14. On the other hand, the floated-up oil Y which has accumulated at the upper layer in the separator tank A flows into the oil tank D, flooding over the partition wall 12, to be discharged out of the tank through the oil outlet 23 opened through the bottom of the oil tank D. Since in this embodiment, a large number of charged plates 8 are laterally installed, forming a roundabout route 18 for passing the oil-water mixed liquid therebetween, not only the charging effect is enhanced, but the passage for the oil-water mixed liquid X is lengthened as well, whereby the oil-water separation effect is elevated.

Figure 3A:
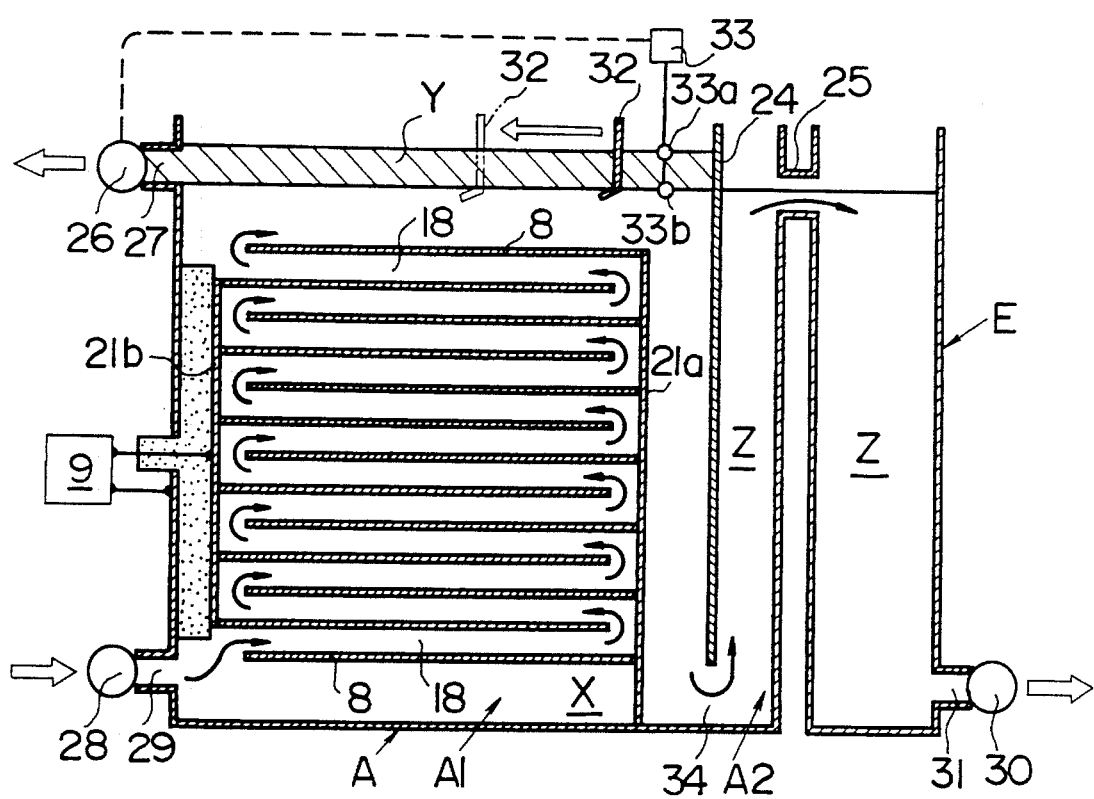
FIG. 3(a) is a longitudinal sectional view for explanation of the third embodiment of this invention.
Figure 3B:
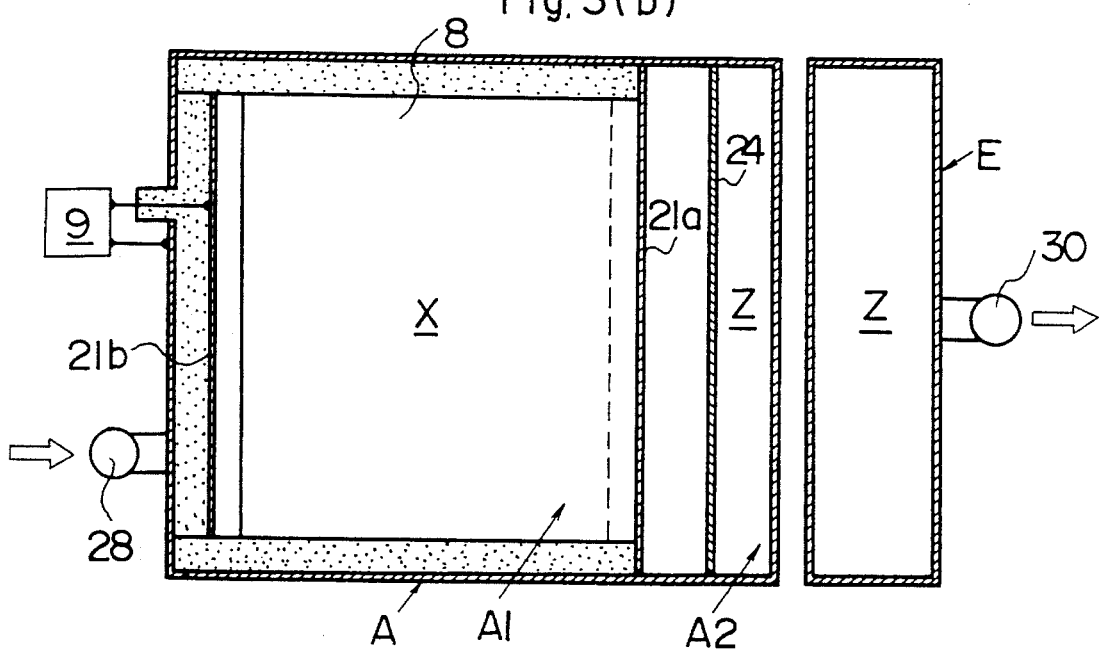
FIG. 3(b) is a lateral sectional view for explanation of the same.

FIGS. 3(*a*) and (*b*) represent the third embodiment of this invention, in which similarly as in the first embodiment, a partition plate 24 is hung in the separator tank A, thereby demarcating it into an oil-water separation space A1 and a separated water containing space A2, then, while laterally installing a large number of charged plates 8 in the oil-water separation space A1, an intermediate tank E for containing the water content is interconnected with the separator tank through a connection pipe 25 and, further, pumps for making the works of liquid-feeding, draining and oil-discharging are attached.

As exemplified in this figure, at the top of the oil-water separation space A1, there is provided an oil outlet 27 with an oil discharge pump 26 attached; at the bottom of the oil-water separation space A1, a liquid inlet 29 with a feed liquid pump 28 attached; and at the bottom of the intermediate tank E, a drain hole 31 with a drain pump 30 attached.

At the surface layer part of the oil-water mixed liquid in the oil-water separation space A1, an oil gathering plate 32 for pushing the floated-up oil toward the oil outlet 27 is arranged overall in the width direction of the oil-water separation space A1. At the top layer part of the oil-water mixed liquid, there is located the detection section of an oil level detection sensor 33 provided for simultaneously controlling the transfer timing of the aforementioned oil gathering plate 32 and the operation timing of the oil discharge pump 26. The detection section is composed of a top detection part 33a for prescribing the timing for starting the oil discharge and starting the transfer of the oil gathering plate 32 and a bottom detection part 33b for prescribing the timing for suspending the oil discharge and stopping the transfer of the oil gathering plate.

In the oil-water separation apparatus of this embodiment, the source liquid pressed in through the liquid inlet 29 by a feed liquid pump 28 is led in between the charged plates, similarly as in the second embodiment, to be subject to oil-water separation; then, the separated oil content is accumulated at the top layer of the oil-water separation space A1; on the other hand, the water content is let flow into the separated water containing space A2 through the communication route 34 and, thereafter, into the intermediate tank E through the connection pipe 25 and at the stage where water is accumulated to a preset amount, it is drained by operating the drain pump 50. As the oil level of the floated-oil accumulated at the top layer of the oil-water separation space A1 rises over the upper detection section 33a of the oil level detection sensor 33, the oil gathering plate 32 is moved toward the oil outlet 27 and coincidentally therewith, the oil discharge pump 26 is operated, to discharge the oil content through the oil outlet 27.

According to the third embodiment, the floated-up oil is discharged by the cooperating work of the oil gathering plate 32 and the oil discharge pump 26, for the benefit of elevated oil discharge efficiency.

Figure 4A:
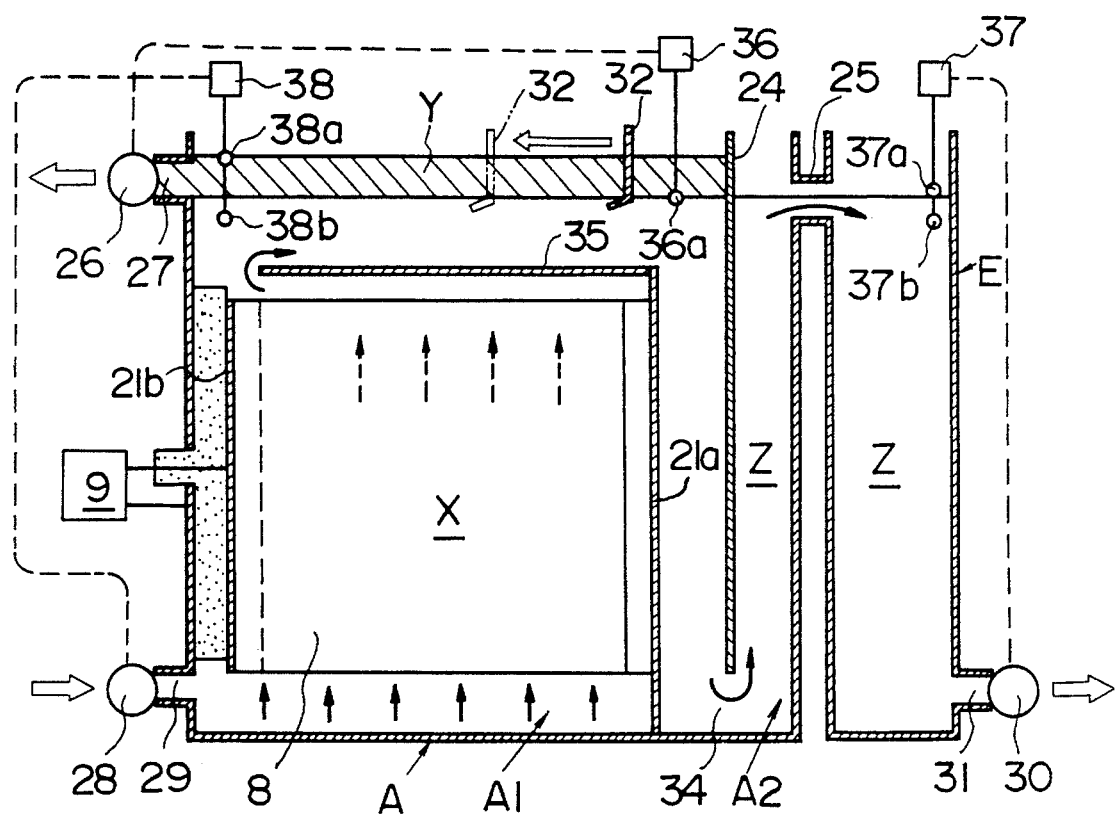
FIG. 4(a) is a longitudinal sectional view for explanation of the fourth embodiment of this invention.
Figure 4B:
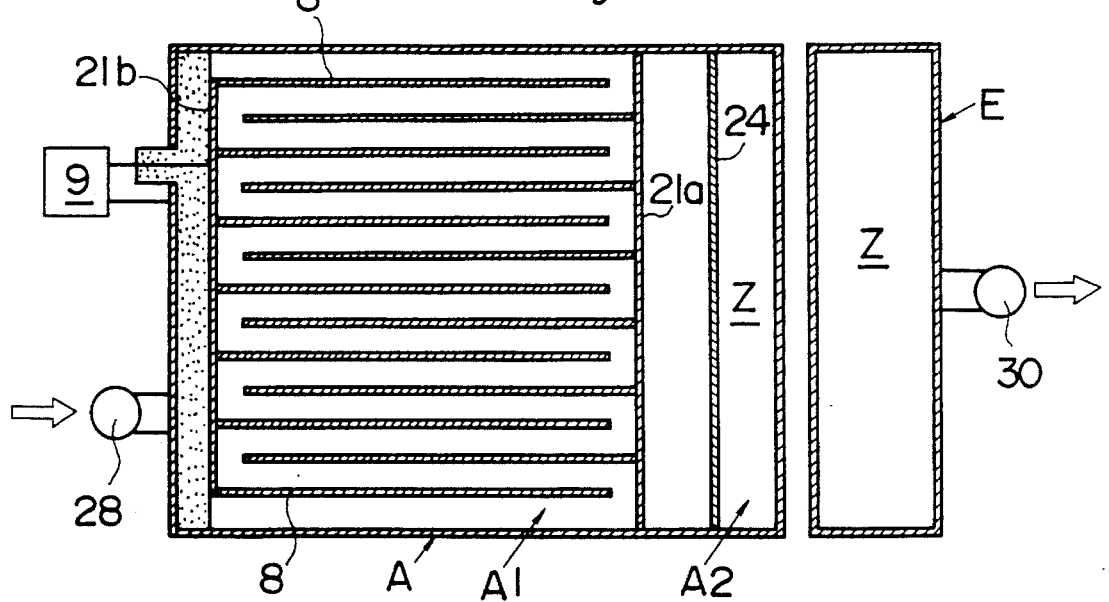
FIG. 4(b) is a lateral sectional view for explanation of the same.

The apparatus of FIGS. 4(a) and (b) is designed to be of a construction such that the charged plates 8 of the aforementioned third embodiment are longitudinally installed in vertical direction and while a roundabout plate 35 for detouring the oil-water mixed liquid X which has risen to the top of these charged plates 8 is laterally installed, an oil-water interface detection sensor 36 for controlling the operations of the oil gathering plate 32 and the oil discharge pump 26, a water level detection sensor 37 for controlling the operation of the drain pump 30 and a liquid level detection sensor 38 for controlling the operation of the feed liquid pump 28 are provided. In the oil-water interface detection sensor 36, there is provided a detection part 36a for prescribing the operation stop timing of the oil gathering plate 32 and the oil discharge pump 26; in the liquid level detection sensor 38, the lower level detection part 38b for prescribing the operation start timing of the feed liquid pump 28 and the upper level detection part 38a for prescribing the stop timing of the feed liquid pump 28; and in the water level detection sensor 37, the upper level detection part 37a for prescribing the operation timing of the drain pump 30 and the lower level detection part 37b for prescribing its stop timing.

In this embodiment, the source liquid pressed in through the liquid inlet 29 is subjected to oil-water separation, while passing between the longitudinally installed charged plates 8. Because the charged plates are longitudinally installed, it is possible to make the amount of oil stuck on the charged plates small. Accordingly, not only an oil-water separation apparatus which does not require maintenance for a long period of time, but such an apparatus which is adaptable for oil-water separation with high concentration oil-water mixed liquids may be offered. Besides, with the controls for feeding and discharging oil and for draining all made by means of sensors, no manual handling is required in its operation.

Figure 5A:
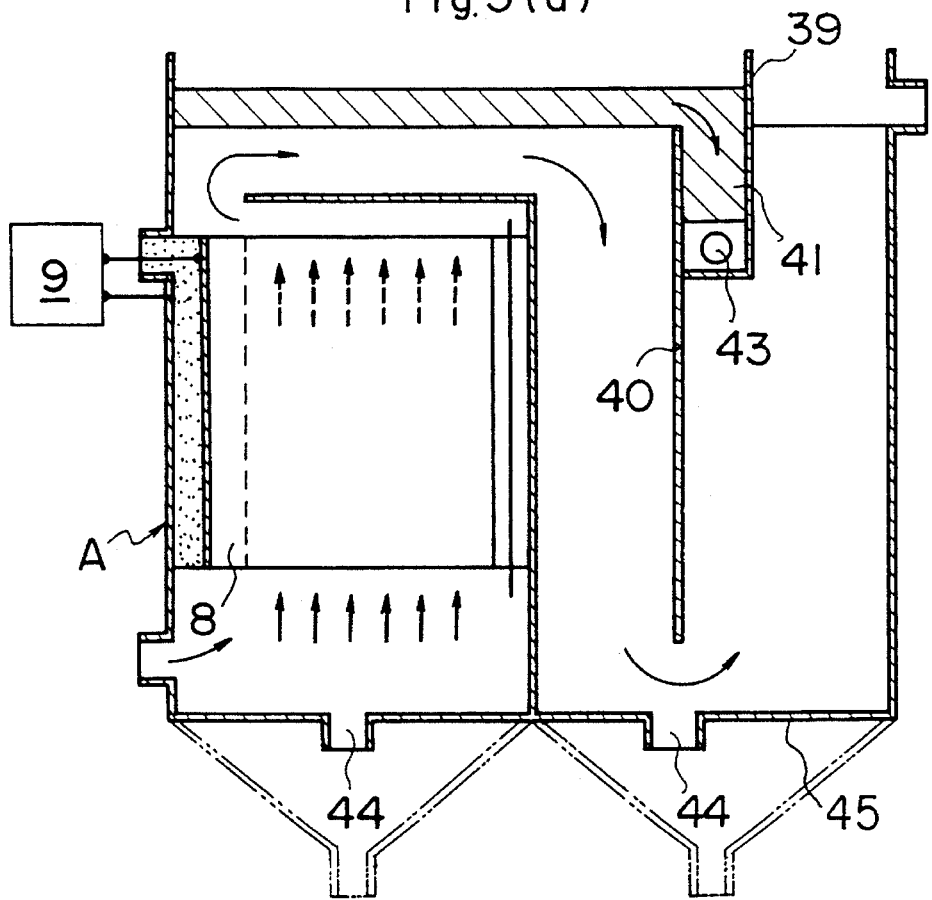
FIG. 5(a) is a longitudinal sectional view for explanation of the fifth embodiment of this invention.
Figure 5B:
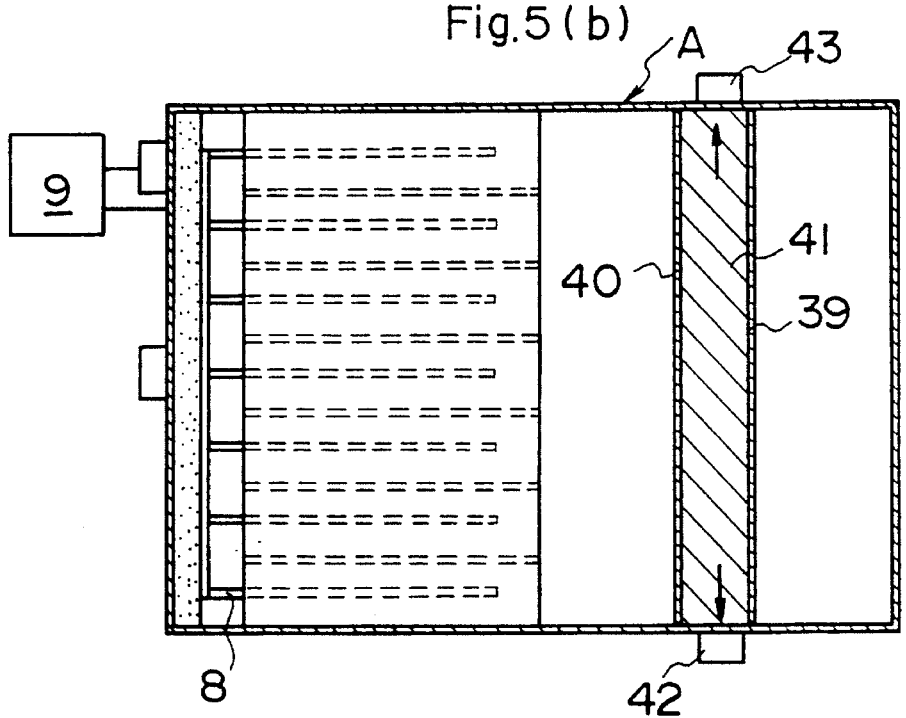
FIG. 5(b) is a lateral sectional view for explanation of the same.
Figure 5C:
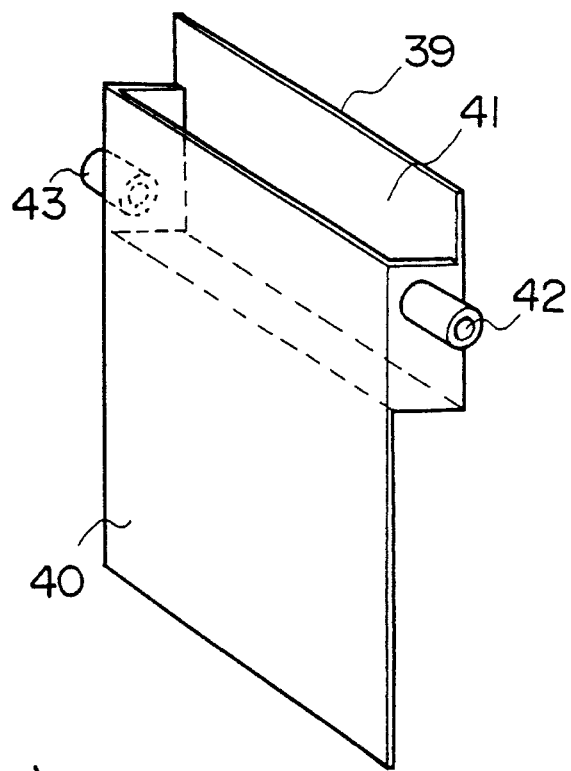
FIG. 5(c) is a perspective view showing a partition structure of the same.

The apparatus of FIGS. 5(a) and (b) is one improved in its structure on the perimeter of the partition plate. As shown in FIG. 5(c), it is so composed that an oil-water separation plate 40 with its top placed nearly flush with the oil-water interface is hung on one side position of the short auxiliary partition plate 39, thereby forming a shallow separated oil tank 41 between the auxiliary partition plate 39 and the oil-water separation plate 40, while a separated oil outlet 42 is opened through a side plate of the separator tank A, being also one of both ends of said separated oil tank, as seen in its longitudinal direction and at the other end, an outlet 43 for the water mixed in the separated oil is opened. This structure is substituted for the above-described partition plate. The presetting of the top level of the oil-water separation plate 40 is of such an importance that the concentration of the oil content separated will be influenced by the level of its top. Although not shown in this figure, the top level of the oil-water separation plate may be subjected to fine adjustment, accroding to this embodiment.

When such a partition structure is used, the floated-up oil which has flowed over the top of the oil-water separation plate 40 into the separated oil tank 41 is further separated in the separated oil tank 41. And the high concentration oil accumulated at the upper layer is discharged out of the separator tank A through the separated oil outlet 42. On the other hand, the water content with low oil content concentration which has settled to the lower layer is discharged out of the separator tank A through the outlet 43 for the water mixed in the separated oil. Since in this embodiment, the separated oil tank 41 is formed on the forward side, as seen in the flow direction of the oil content which has floated up between the charged electrodes 8, the gathering of the floated-up oil is very smoothly performed.

In this figure, 44 denotes drains, which are provided at the bottom of the separator tank A for the porpose of appropriately discharging out of the tank such sludge as dirt, rubbish, etc., which has precipitated and deposited in the tank in the process of continuously operating this oil-water separation apparatus. The bottom of the separator tank A may be inclined, as shown by imaginary lines, thereby facilitating the take-out of sludge.

The apparatus illustrated has charged plates 8 longitudinally installed in the vertical direction, but it is, of course, possible to laterally install the charged plates in the horizontal direction.

Figure 6A:
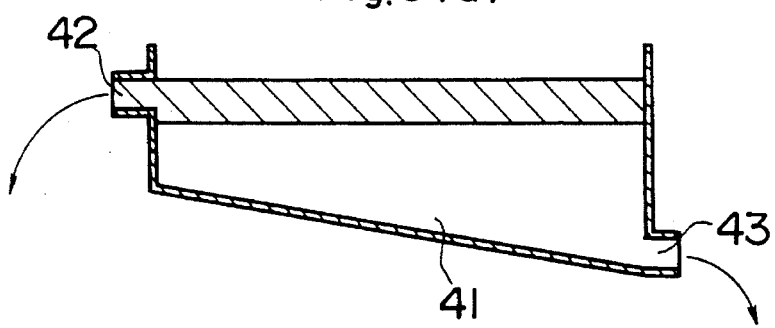
FIGS. 6(a) and (b) are sectional views for explanation, showing a partition structure of another embodiment.
Figure 6B:
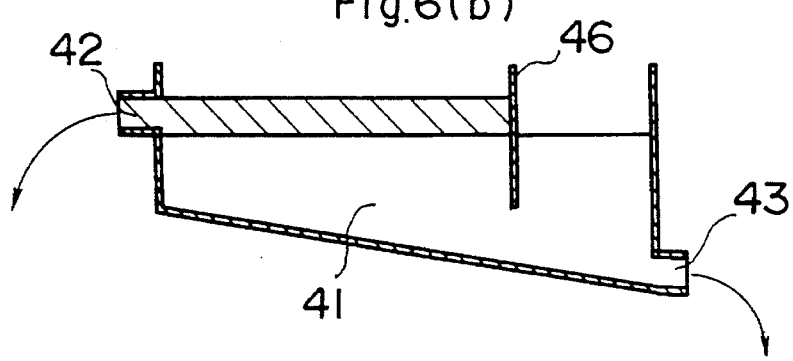

As the separated oil tank 41, other shapes than those shown in FIG. 5(c) may be employed. For example, it is also possible to slope the tank bottom 45, as shown in FIG. 6(a) or hang a reseparating plate 46 for partitioning the inside tank space, as shown in FIG. 6(b).

Figure 7:
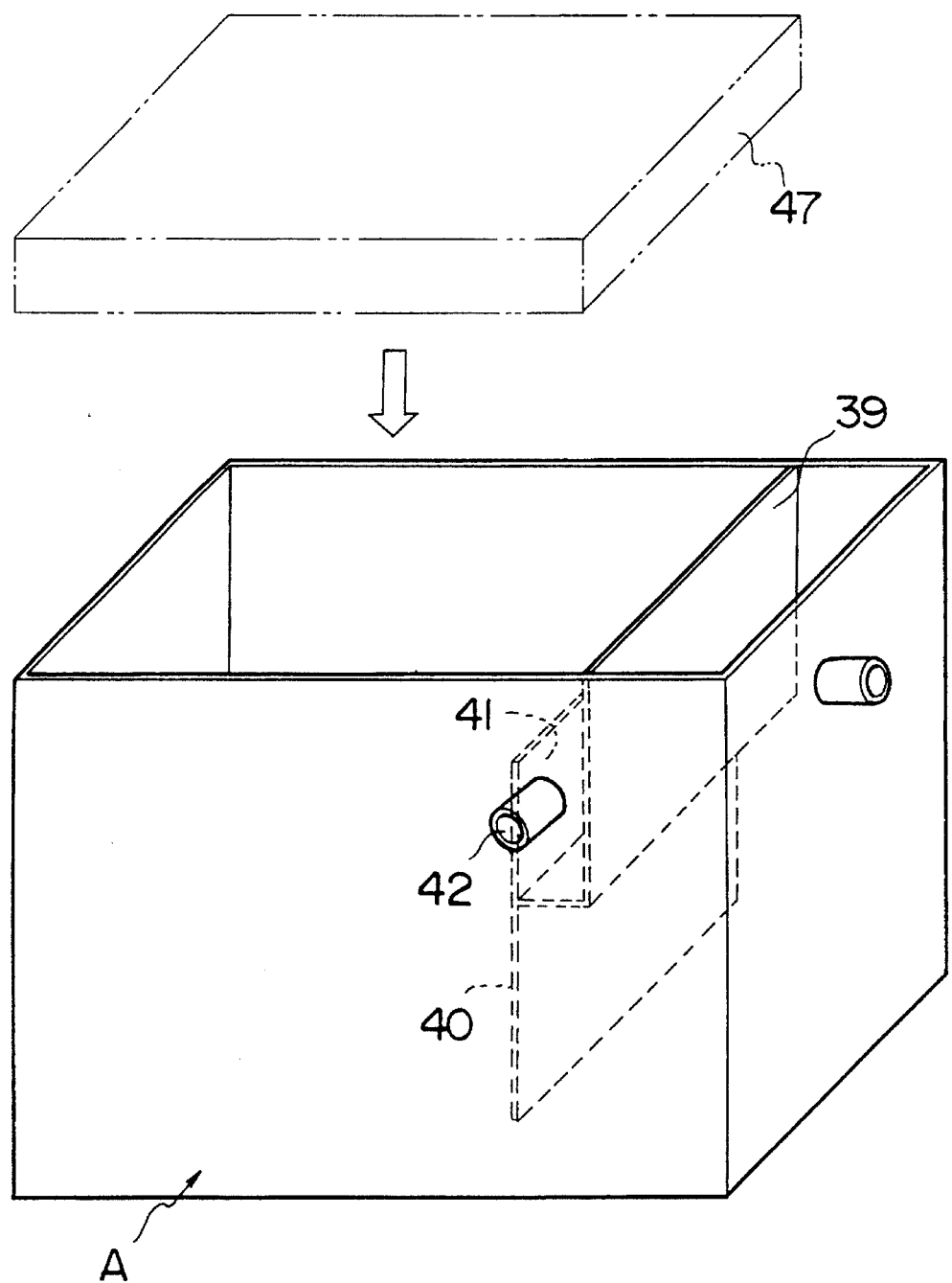
FIG. 7 is a perspective view showing the external appearance of the separator tank with a partition structure attached.

The figure given as FIG. 7 is a perspective view showing a separator tank A having the above-described partition structure provided therein. In such a separator tank A, it is preferable to provide a forcible guiding means 47 for leading the floated-up oil in the oil-water separation space A1 into the separated oil tank 41 provided in the partition structure, for the benefit of enhanced oil-water separation efficiency. Employed as the forcible guiding means 47 is, for example, the one shown in FIG. 8(*a*) in which with a blower 48 disposed at one longitudinal side of the separator tank A, to blow air on the oil surface, and with a rotary brush 49 arranged above the oil-water separation plate 40, the floated-up oil is guided to the separator tank 41, etc. The rotary brush 49 is composed by radially implanting vane pieces 51 made of such a corrosion resistant resin as silicon resin, etc., in the shaft body 50 extending in the width direction of the separator tank A. The vane pieces 51 are elastically deformably composed, so that rubbish or soil sticking on the top of the oil-water separation plate 40 may be scraped off by letting them come in contact with the top of the oil-water separation plate 40.

Figure 8A:
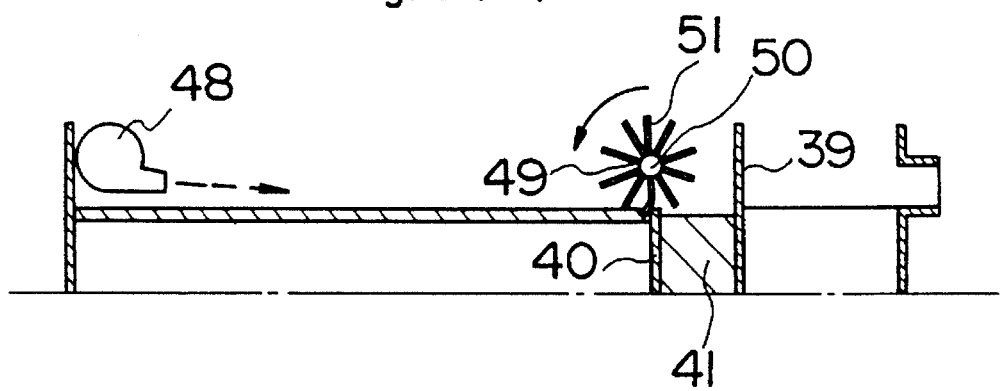
FIGS. 8(a) and (b) are diagrams for explanation of the forcible guiding means.
Figure 8B:
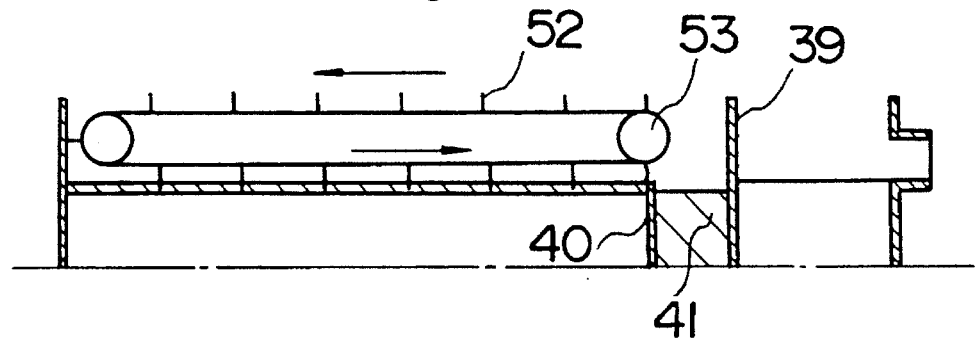

FIG. 8(*b*) illustrates another embodiment of the forcible guiding means, in which the floated-up oil is scraped out into the separated oil tank 41 by means of a belt conveyor 53 having vane pieces 52 implanted therein. As the forcible guiding means, other devices are also usable.

Figure 9:
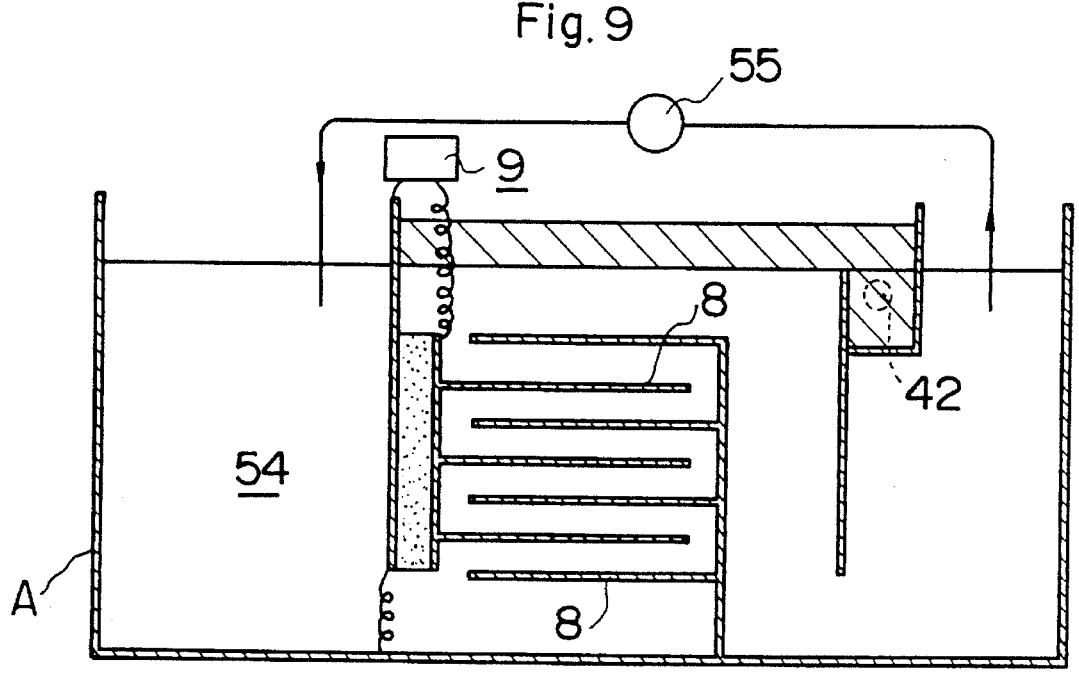
FIGS. 9 and 10 are diagrams for explanation of embodiments, showing the space for containing the object liquid to be treated provided in the separator tank.

The embodiments hereabove-described are completely independent ones as oil-water separation apparatuses, but this apparatus may be integrated with a cleaning tank, a mold releasing agent tank or, further, a coolant tank in which the object liquid to be treated is contained, thereby saving the trouble for transferring the object liquid to be treated. The apparatus shown in FIG. 9 is one having a cleaning tank 54 integrated with the separator tank A. The cleaning work is performed in the cleaning tank 54 in the usual manner. The polluted cleaning liquid is directly led between the charged plates 8, to be subjected to oil-water separation, and after the separated oil content is once accumulated in the separated oil tank 41, it is discharged out of the separator tank A through the separated oil outlet 42. On the other hand, the cleaning liquid deprived of the oil content is refluxed to the cleaning tank 54 by means of a circulation pump 55.

Figure 10:
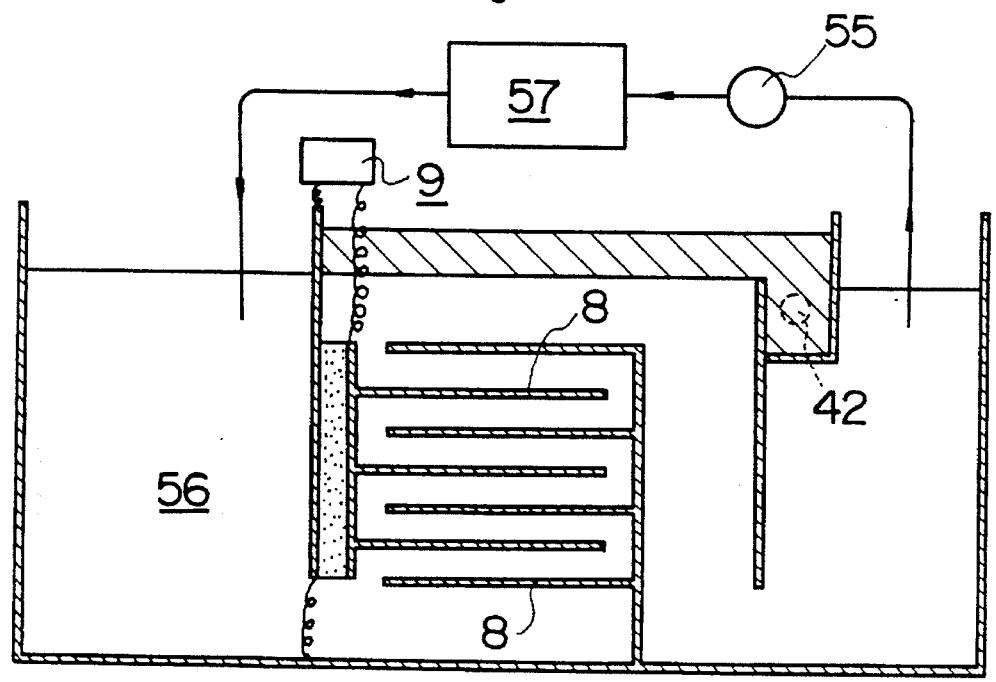

The figure shown as FIG. 10 illustrates a case in which a mold releasing agent tank 56 is integrally installed with the separator tank, to subject the object liquid to be treated in the mold releasing agent tank 56 to the oil-water separation treatment, and moreover, various types of machines 57 are arranged midway in the circulation route for the liquid to be treated.

Various modes of this invention for which the application has been filed have been described hereabove, but it is not restricted to such embodiments only; other modes may be employed, as appropriate.

Finally, the results of the experiment conducted for ascertaining the effect of this invention are described: The present inventors conducted an experiment, to confirm the effect of applying a voltage on the oil-water mixed liquid, being the object of treatment. This experiment was conducted, using a water separation apparatus having the construction shown as the fourth embodiment, with the flow rate of the liquid circulated preset at 3500 l/Hr, with no voltage applied between each two charged plates 8 arranged vis-à-vis in one case and with an AC voltage of 25 V (60 Hz) applied in the other. As the oil-water mixed liquid, being the object of treatment, the oil-water mixed liquid discharged from a hot forging machine is chosen; in particular, 20,000 l of a mixed liquid of an aqueous solution containing water soluble graphite mold releasing agent or an aqueous solution with a 10% graphite concentration and a high viscosity lubricating oil. The oil-water mixed liquid discharged from the hot forging machine is led into this oil-water separation apparatus through the liquid inlet 29; on the other hand, the treated water led out through the drain hole 31 of this oil-water separation apparatus is again fed into the hot forging machine, to examine how the oil content concentration in the oil-water mixed liquid undergoes change in the process of circulating between the hot forging machine and the oil-water separation apparatus. The result is shown as FIG. 11. The test was started from the state of the oil content concentration being 4.0% by volume and continued over 35 days. The ordinate in FIG. 11 represents the oil content concentration, and the abscissa the number of elapsed days. In this graph, the result indicated by a broken line represents that obtained when no voltage is applied on the charged plates, while the one indicated by a real line represents that obtained when the voltage is applied.

This graph clearly shows that when no voltage is applied, the oil content continuously mixing in from the hot forging machine can hardly be removed off, so that the oil content concentration continues increasing with passage of days. The reason why the graph has recorded only up to the 20th day is that the increasing trend is nearly constant, showing no change; therefore, the measurement beyond 20th day was judged unnecessary and stopped. In contrast, it implies that when the voltage is applied, the oil content continues decreasing up to the 15th day, becomes almost stable, after the oil content concentration has declined down to approx. 0.5% by volume; thereafter, this value is maintained. In this way, it is ascertained that in the oil-water separation apparatus of this invention with a voltage applied between the charged plates, it is possible to separate and regenerate the aqueous solution containing water-soluble graphite mold releasing agent from the oil-water mixed liquid discharged out of a hot forging machine, so that the aqueous solution containing the water-soluble graphite mold releasing agent may be reutilized whatever number times.

Into the water-soluble graphite mold releasing agent for use with hot forging machines, high viscosity lubricating oil is known to continuously mix, because of the structure of such hot forging machines, and it is known that if that oil content is higher than 1% by volume, its function as a mold releasing agent notably declines, posing the problem of worn mold. Since the aqueous solution of the water-soluble graphite mold releasing agent into which lubricating oil has mixed is an alkali solution with approx. pH 10, the mixed-in oil content tends to be emulsified, separation of such emulsified oil content being almost impossible by the conventional natural separation method by use of a partition plate. Accordingly, new liquid, if used, will have 3–4% by volume oil content in about one month; therefore, it needs to be replaced with a new liquid, for which enormous expense must be borne. With the oil-water separation apparatus of this invention, the water-soluble graphite mold releasing agent is repetitively reusable, obviating the need for its renewal and thus, enabling great cutback on expense.

As described in the foregoing, since the oil-water separation apparatus of this invention is of a construction such that the inside of the oil-water separator tank is bisected into an oil-water separation space and a separated water containing space by a partition plate or an inverse U-shape tube or, further, by a partition structure to replace the partition plate and that each two of charged plates are arranged vis-à-vis in the oil-water separation space, the oil drop particles floating in the oil-water mixed liquid contained in the oil-water separation space have their zeta potential neutralized, to be cohered into coarse particles; thereafter, they float up due to their sp.gr. difference from the liquid. On this account, treatment of mixed liquids of high viscosity oil and water, heavily polluted oil-water mixed liquids and, further, oil-water mixed liquids into which any surfactant is mixed, etc., is possible.

The oil-water separation apparatus of this invention is designed to be of a construction such that in a top-opened separator tank, the inside-tank space is disected into an oil-water separation space and a separated water containing space, a partition plate is hung, forming under its bottom a communication route for enabling circulation between these two spaces and while opening an oil outlet through the part of the tank wall where the separated oil accumulates, a plurality of charged plates on which a voltage is applied are arranged, each two of them via-1-via, in the aforementioned oil-water separation space, tile source liquid Is fed in the oil-water separation space on which the electric field acts. Accordingly, the electric field acts on the oil-water mixed liquid of the source liquid fed into the oil-water separator tank in addition to the physical separation action based on the sp. gr. difference; as a result, tile zeta-potential that the oil drops in the oil-water mixed liquid have is neutralized, thereby the cohesion of the oil drop particles into coarse particles by dint of their molecular attraction is promoted. Consequently, not only the efficiency of the oil-water separation is drastically enhanced, but oil-water separation of a mixed liquids of high viscosity oil and water or heavily polluted oil-water mixed liquids which was impossible by the conventional methods becomes practical. Moreover, the separated oil content is recovered through the oil outlet; on the other hand, the separated water content is automatically accumulated in the separated water containing space, enabling a large amount of oil-water mixed liquid to be treated by merely feeding the source liquid into the oil-water separation space. And this oil-water separation apparatus is of a top-opened type, the cleaning of the tank-inside is easy, thus permitting excellent oil-water separability to be maintained for long.

When an inverse U-shape tube is used in place of the partition plate, the tube-inside space is used as the separated water containing space, so that the separated water is discharged out of the tank through the tube-inside.

When with an oil outlet opened through the upper part of the tank wall surrounding the oil-water separation space, the floated-up oil is discharged by itself through said oil outlet, the oil discharge pump and the sensor for controlling said oil discharge pump, etc., are unnecessary, for the benefit of simplification of the apparatus structure.

When a large number of charged plates are laterally installed in the horizontal direction, not only the charging effect is enhanced, but the passage is lengthened for the benefit of higher separation accuracy, because a roundabout route for passing the oil-water mixed liquid is formed between the charged plates.

When the charged plates are longitudinally installed in the vertical direction, in addition to the enhanced charging effect, the amount of sticking oil is reduced, so that an easy to handle oil-water separation apparatus which does not require such maintenance as replacement of charged plates in its long time use may be provided.

I claim:

1. An oil-water separation apparatus, comprising:

a source liquid tank adapted to contain an oil-water mixed liquid to be separated, said liquid being a mixture of water and oil;

a separator tank in communication with said source liquid tank, said separator tank being adapted to receive the oil-water mixed liquid from said source liquid tank, said separator tank including a bottom wall, first and second spaced parallel sidewalls, and first and second spaced parallel end walls;

a liquid inlet located in said first end wall proximate said bottom wall;

a water outlet located in said second end wall having a center spaced a first predetermined distance from said bottom wall;

an oil outlet located in said first end wall and having a center spaced a second predetermined distance from said bottom wall of said separator tank, said second predetermined distance being greater than said first predetermined distance;

a partition plate disposed in an interior region of said separator tank, said partition plate separating said interior region into a first region adapted for use in oil-water separation and a second region adapted for containing separated water, said partition plate being suspended in said tank with one end thereof spaced from said bottom wall of said tank, and having spaced edge portions sealingly attached to said sidewalls, said partition plate extending perpendicularly to said bottom wall and side walls and extending parallel to said end walls, a communication route which exists between said one end of said partition plate and said bottom wall enabling circulation between said oil-water separation region and said separated water containing region;

a plurality of spaced first electrode plates arranged within said oil-water separation region and extending parallel to said sidewalls and perpendicularly to said bottom wall and said end walls, wherein said plurality of spaced electrode plates is comprised of a first plurality of grounded electrode plates that are grounded to said tank walls and a second plurality of spaced charged electrode plates that are insulated from said tank walls, wherein a said charged electrode plate is positioned between a pair of grounded electrode plates;

a voltage source connected between said tank walls and said second plurality of spaced charged electrode plates for applying a voltage between adjacent ones of said spaced electrode plates;

a first supporting plate proximate to and extending parallel to said first end wall for insulatingly supporting said second plurality of spaced charged electrode plates at one end thereof, said first supporting plate electrically connecting said voltage source to said charged electrode plates;

a second supporting plate for fixing and integrally supporting one end portion of said first plurality of grounded electrode plates and grounding said grounded electrode plates to said tank side walls, said second supporting plate being located proximate to and extending parallel to said partition plate and having edge portions sealingly connected to said bottom and side walls; and said second region also functioning as a passage for leading the separated water from said communication route to said water outlet.

2. The oil-water separation apparatus, as claimed in claim 1, wherein said voltage source applies an AC voltage in a range of 1–50 V/cm between said electrode plates.

3. An oil-water separation apparatus as claimed in claim 1, wherein an oil driving means is disposed at the upper portion within said oil-water separation region, said oil driving means is a scraper adapted for driving toward said oil outlet the oil which is risen up and accumulated at the upper part within said oil-water separation region.

4. An oil-water apparatus as claimed in claim 3, wherein said oil driving means is a plate which is substantially the same with said oil-water separation region in width and is movable sidewards at the upper portion within said oil-water separation region.

5. A method of separating oil from water comprising the steps of:

provided the apparatus according to claim 1;

feeding an oil-water mixture through said liquid inlet such that said mixture passes upward through said plurality of spaced electrode plates; and providing an electric field between adjacent ones of said charged electrode plates and said grounded electrode plates on said mixture to separate said mixture into separated oil and separated water;

whereby the separated oil floats up by specific gravity difference and accumulates on an upper surface of an oil water interface in said oil-water separation region;

whereby the separated water is led from the oil-water separation region to said second region for containing separated water through said communication route and discharged through the water outlet.

* * * * *